US010275805B2

(12) United States Patent
Geer, III et al.

(10) Patent No.: US 10,275,805 B2
(45) Date of Patent: *Apr. 30, 2019

(54) INTEGRATION OF A WALL-TO-WALL ADVERTISING UNIT AND DIGITAL MEDIA CONTENT

(71) Applicant: Viacom International, Inc., New York, NY (US)

(72) Inventors: Walter Geer, III, New York, NY (US); Ellen To, New York, NY (US); Suzanne McDonnell, New York, NY (US); Jason Witt, New York, NY (US); Joanne Levy, New York, NY (US)

(73) Assignee: Viacom International Inc., New York, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/294,166

(22) Filed: Oct. 14, 2016

(65) Prior Publication Data

US 2017/0032431 A1 Feb. 2, 2017

Related U.S. Application Data

(63) Continuation of application No. 12/964,166, filed on Dec. 9, 2010, now abandoned.
(Continued)

(51) Int. Cl.
*G06Q 30/02* (2012.01)
*G06F 3/0484* (2013.01)
(Continued)

(52) U.S. Cl.
CPC ..... *G06Q 30/0277* (2013.01); *G06F 3/04845* (2013.01); *G06Q 30/0241* (2013.01);
(Continued)

(58) Field of Classification Search
CPC ...................................................... G06Q 30/02
(Continued)

(56) References Cited

U.S. PATENT DOCUMENTS

| 6,912,504 | B1 | 6/2005 | Rashkovskiy |
| 7,054,831 | B2 | 5/2006 | Koenig |
| 7,263,714 | B2 | 8/2007 | Lowthert et al. |
| 2001/0056370 | A1 | 12/2001 | Tafla |
| 2004/0015608 | A1 | 1/2004 | Ellis et al. |
| 2004/0116183 | A1 | 6/2004 | Prindle |
| 2004/0186771 | A1 | 9/2004 | Squires |
| 2005/0267813 | A1 | 12/2005 | Monday |
| 2006/0143675 | A1 | 6/2006 | Willis et al. |
| 2006/0242016 | A1 | 10/2006 | Chenard |
| 2007/0072676 | A1 | 3/2007 | Baluja |
| 2007/0112630 | A1 | 5/2007 | Lau et al. |
| 2007/0260677 | A1 | 11/2007 | DeMarco et al. |
| 2008/0021775 | A1 | 1/2008 | Lerman et al. |

(Continued)

*Primary Examiner* — Marilyn G Macasiano
(74) *Attorney, Agent, or Firm* — Fay Kaplun & Marcin, LLP (57) ABSTRACT

Described are methods and systems for dynamic integration and presentation of advertising content and media content. A server computing device receives a request for media content from a remote computing device, and provides an interactive advertising unit. The interactive advertising unit includes a first content layer including the requested media content, a media player, and website content; a second content layer including the advertising content, wherein the advertising content comprises video content; and an integration module. The integration module is configured to display the video content to match the boundaries of the media player, extend the display area of the video content beyond the boundaries of the media player and underneath the website content of the first content layer, reduce the display area of the video content after a period of time to match the boundaries of the media player, and display the requested media content in the media player.

14 Claims, 7 Drawing Sheets

Related U.S. Application Data (60) Provisional application No. 61/285,035, filed on Dec. 9, 2009.

(51) Int. Cl.
  *H04N 21/2343* (2011.01)
  *H04N 21/2387* (2011.01)
  *H04N 21/431* (2011.01)
  *H04N 21/485* (2011.01)
  *H04N 21/81* (2011.01)

(52) U.S. Cl.
  CPC . *H04N 21/2387* (2013.01); *H04N 21/234363* (2013.01); *H04N 21/4312* (2013.01); *H04N 21/4858* (2013.01); *H04N 21/812* (2013.01)

(58) Field of Classification Search
  USPC .................................................... 705/14.73
  See application file for complete search history.

(56) References Cited

U.S. PATENT DOCUMENTS

| | | |
|---|---|---|
| 2008/0066107 A1 | 3/2008 | Moonka et al. |
| 2008/0077952 A1 | 3/2008 | St. Jean et al. |
| 2008/0097915 A1 | 4/2008 | Golan et al. |
| 2008/0194332 A1 | 8/2008 | Kadikario et al. |
| 2008/0209465 A1 | 8/2008 | Thomas et al. |
| 2008/0320512 A1 | 12/2008 | Knight |
| 2009/0024482 A1 | 1/2009 | Synstelien et al. |
| 2009/0063280 A1 | 3/2009 | Wurster et al. |
| 2009/0094525 A1 | 4/2009 | Coelius et al. |
| 2009/0163281 A1 | 6/2009 | Wang |
| 2009/0265367 A1 | 10/2009 | Corbett |

INTEGRATION OF A WALL-TO-WALL ADVERTISING UNIT AND DIGITAL MEDIA CONTENT

RELATED APPLICATIONS

The present application is a Continuation Application of U.S. Non-Provisional patent application Ser. No. 12/964,166 filed on Dec. 9, 2010; which claims priority to U.S. Provisional Patent Application Ser. No. 61/285,035 filed on Dec. 9, 2009. The entire disclosure of these prior applications/patents are considered as being part of the disclosure of the accompanying application and hereby expressly incorporated by reference herein.

TECHNICAL FIELD

The subject matter of this application relates generally to methods and apparatuses, including computer program products, for integration of a wall-to-wall advertising unit and digital media content.

BACKGROUND

Content providers have long sought to include advertising as part of their broadcasts in order to generate revenue and recoup the costs of content production, and manufacturers of consumer goods have placed their ads with various content providers in order to extol the virtues of their goods to the largest possible consumer audience. For example, ever since their earliest days, radio and television stations frequently have broadcast blocks of ads in between their programming segments. More recently, content providers on the Internet have utilized banner advertisements, pop-up advertisements, and other forms of interactive advertising on websites.

In order to capitalize on the recent explosion in availability of online media e.g., streaming video feeds), content providers, consumer goods companies, and advertising firms have turned their attention to developing dynamic and interactive experiences for users who access the online media.

SUMMARY OF THE INVENTION

It would be desirable to have a method and system for dynamically integrating advertising content with media content (e.g., digital media content) to achieve the effect of linking the advertisement with the context of the digital media content, web page, and/or the embedded media player, thereby increasing the advertisement's exposure to the consumer. Also, it would be desirable in some examples to completely interrupt the desired media content in a linear fashion by displaying the advertising content first, but also providing the user with a mechanism to interact with the advertising content and view the media content. It would be desirable in some examples to present the advertising content and the digital media content in a non-linear fashion so to leave the digital media content uninterrupted and substantially unobstructed while at the same time displaying the advertising content to the user, allowing the user to enjoy the desired media content while simultaneously viewing the advertising content. Also, it would be desirable in some examples to allow the user to interact with the advertising content and/or tie the media content and the advertising content together in a unique and unanticipated way.

In general overview, the techniques described herein are related to integration of a fully interactive rich media advertising unit and media content (e.g., digital media content) presented in a media player. The techniques provide for simulated integration, creating an illusion to a user that the advertising content and digital media content are brought together in the media player. The techniques also provide for functional integration via interaction between the advertising unit and the media player, including manipulation of spatial, temporal, and control components, resulting in a unique presentation of the advertising content and digital media content to the user. Spatial integration refers to the synchronization of position and coverage between the advertising unit and the media player. Temporal integration refers to the coordination of content display timing between the advertising unit and the media player. Control integration refers to the communication between the advertising unit and the media player in transferring influence and priority of displayed content. The techniques advantageously enable dynamic and unexpected interplay between digital media content contained in an embedded media player and an interactive, persistent advertising unit configured to capture the attention of a user and offer an engaging, memorable experience.

The invention, in one aspect, features a method for dynamic integration and presentation of advertising content and media content. The method includes receiving, by a server computing device, a request for media content from a remote computing device, and providing, by the server computing device in response to the request, an interactive advertising unit. The interactive advertising unit includes a first content layer including the requested media content, a media player, and website content; a second content layer including the advertising content, wherein the advertising content comprises video content; and an integration module. The integration module is configured to display the video content to match the boundaries of the media player, extend the display area of the video content beyond the boundaries of the media player and underneath the website content of the first content layer, reduce the display area of the video content after a period of time to match the boundaries of the media player, and display the requested media content in the media player.

The invention, in another aspect, features a system for dynamic integration and presentation of advertising content and media content. The system includes a server computing device configured to receive a request for media content from a remote computing device, and provide, in response to the request, an interactive advertising unit. The interactive advertising unit includes a first content layer including the requested media content, a media player, and website content; a second content layer including the advertising content, wherein the advertising content comprises video content; and an integration module. The integration module is configured to display the video content to match the boundaries of the media player, extend the display area of the video content beyond the boundaries of the media player and underneath the website content of the first content layer, reduce the display area of the video content after a period of time to match the boundaries of the media player, and display the requested media content in the media player.

The invention, in another aspect, features a computer program product, tangibly embodied in a computer readable storage medium, for dynamic integration and presentation of advertising content and media content. The computer program product includes instructions operable to configure a data processing apparatus to receive a request for media content front a remote computing device, and provide, in response to the request, an interactive advertising unit. The interactive advertising unit includes a first content layer including the requested media content, a media player, and website content; a second content layer including the advertising content, wherein the advertising content comprises video content; and an integration module. The integration module is configured to display the video content to match the boundaries of the media player, extend the display area of the content beyond the boundaries of the media player and underneath the website content of the first content layer, reduce the display area of the video content after a period of time to match the boundaries of the media player, and display the requested media content in the media player.

In some embodiments, any of the above aspects can include one or more of the following features. In some embodiments, the integration module is configured to manage the spatial presentation of the requested media content and the advertising content, synchronize the temporal presentation of the requested media content and the advertising content, and control the presentation priority of the requested media content and the advertising content, in some embodiments, managing the spatial presentation can include positioning the advertising content over the media player so as to obscure the requested media content.

In some embodiments, the integration module displays an animation in extending the display area of the video content beyond the boundaries of the media player in some embodiments, the animation is synchronized with playback of the video content. In some embodiments, the integration module extends the display area of the video content to a widescreen format. In some embodiments, the video content is displayed in a high definition resolution.

In some embodiments, the integration is configured to display a user interface feature within the boundaries of the media player after extending the display area of the video content beyond the boundaries of the media player and underneath the website content of the first content layer, and display, in response to receiving input associated with the user interface feature, the video content in a fullscreen format, wherein display of the fullscreen format obscures the requested media content, media player, and website content of the first content layer.

In some embodiments, the integration module displays an animation in reducing the display area of the video content to match the boundaries of the media player. In some embodiments, the integration module is configured to receive input based on a user action.

In some embodiments, the video content includes a graphical representation of an advertised product, an advertised service, or both. In some embodiments, the integration module is configured to transmit one or more commands from the second content layer to the first content layer, the one or more commands operable to control playback of the requested media content in the media player.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with thriller advantages, may be better understood by referring to the following description taken in conjunction with the accompanying drawings. The drawings are not necessarily to scale, emphasis instead generally being placed upon illustrating the principles of the invention.

DETAILED DESCRIPTION

In general overview, the techniques described herein are directed to methods and apparatuses, including computer program products, for dynamic integration and presentation of advertising content and media content (e.g., digital media content). As described in more detail, the advertising content is combined with the digital media content (displayed in, for example, a media player) in a seamless fashion to provide an interactive advertising unit. The creation of the interactive advertising unit provides the advantages of greatly increasing a user's exposure to the advertising content while not materially diminishing the user's consumption of the digital media content. The nature of the interactive advertising unit, displaying advertising content in proximity to requested digital media content, allows the use of a broad range of marketing techniques, such as product placement, brand association, and click-through opportunities. Thus, the techniques provide an opportunity for manufacturers to increase the effectiveness of their advertising while maintaining the accessibility and appeal of the requested digital media content.

The display of the advertising and digital media content is not limited to a web browser or traditional embedded media player. For example, the advertising content and/or video content could be displayed to a user via an interactive application downloaded and executed on a smart phone, i.e., an "app" configured to run on the iPhone® from Apple® Computer Inc.

Figure 1:
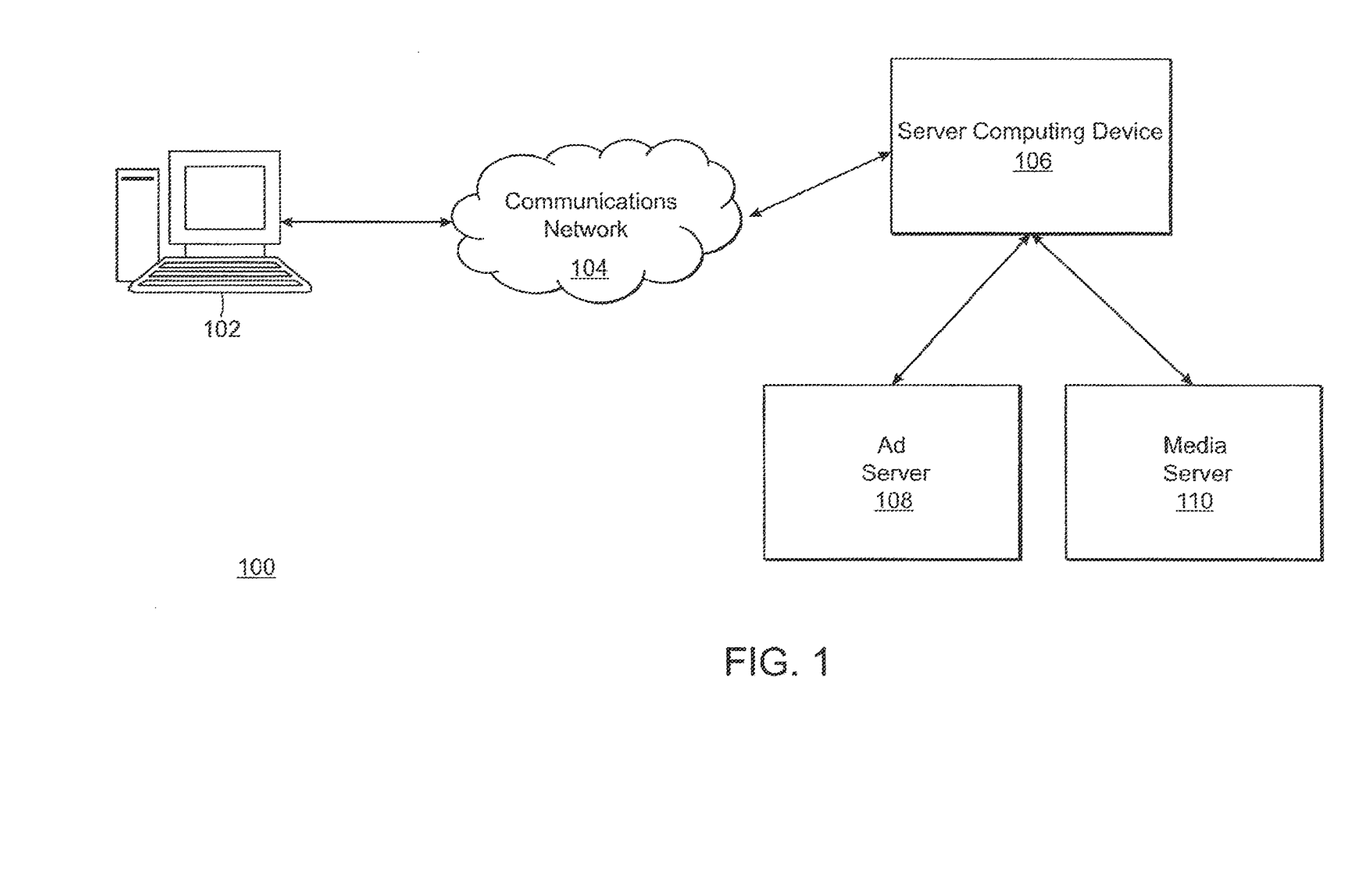
FIG. 1 is a block diagram of a system for the dynamic integration and presentation of advertising and media content.

FIG. 1 is a block diagram of a system 100 for dynamic integration and presentation of advertising and media content. The system 100 includes a client computing device 102, a communications network 104, and a server computing device 106. In some embodiments, the server computing device 106 is connected to one or more other computing devices which provide advertising content (e.g., ad server 108) and digital media content (e.g., media server 110). The server computing device 106, ad server 108, and media server 110 can reside at the same physical location or may be dispersed to multiple physical locations. The server computing device 106, ad server 108, and media server 110 can be located on the same physical device or one or more of the servers 106, 108, 110 can be distributed over many devices. The server computing device 106, ad server 108, and media server 110 can communicate via a communications network, for ex ample communications network 104.

The client computing device 102 is the hardware that displays the interactive advertising unit containing advertising content and. digital media content to a user. Example computing devices take on many forms, including but not limited to a personal computer, a standalone video player, a home video game console, a portable video game system, a personal digital assistant (PDA), an internet appliance, a. smart phone, a set-top box, or the like. The computing device 102 includes network-interface components to enable the user to connect to a communications network 104 such as the Internet. The computing device 102 also includes browser software to enable the user to interact with web sites and other content providers. Some example browser software includes Microsoft® Internet Explorer, Mozilla Firefox®, or other similar software applications. The client computing device 102 also includes digital content playback plug-ins or standalone software to enable the user to view digital media content (e.g., video and audio) received over the communications network 104. Examples of digital media content playback software includes Microsoft® Windows Medial® Player, Adobe® Flash® Player, QuickTime® from Apple® Computer, Inc., or other similar applications.

The server computing device 106 hosts web pages and other similar content, and receives content requests from the client computing device 102 via the communications network 104.

The communications network 104 channels communications from the client computing device 102 to the server computing device 106. The network 104 may be a local network, such as a LAN, or a wide area network, such as the Internet or the World Wide Web.

The ad server 108 hosts advertising content for use by the server computing device 106. In some embodiments, the ad server 108 receives requests for advertising content directly from the client computing device 102 via the communications network 104. In some embodiments, the ad server 108 receives requests for advertising content from the client computing device 102 by way of the server computing device 106. Advertising content can take a variety of forms. Examples include a static banner ad, a graphical animation or an interactive, rich media application that contains graphics, animation, audio, and/or video content, such as a Flash® application.

The media server 110 hosts digital media content for use by the server computing device 106. In some embodiments, the media server 110 can receive requests for digital media content from the client computing device 102 via the communications network 104. In some embodiments, the media server 110 receives requests for advertising content from the client computing device 102 by way of the server computing device 106. The digital media content can take a variety of forms. The media content can be short-form video content, i.e., a four-minute music video. The media content can be long-form video content, i.e., a thirty-minute television program. The media content can be audio content, i.e., a radio broadcast. Other examples include user-submitted amateur video, professional television shows, motion pictures, webcasts, podcasts music videos, or other similar content.

Figure 2:
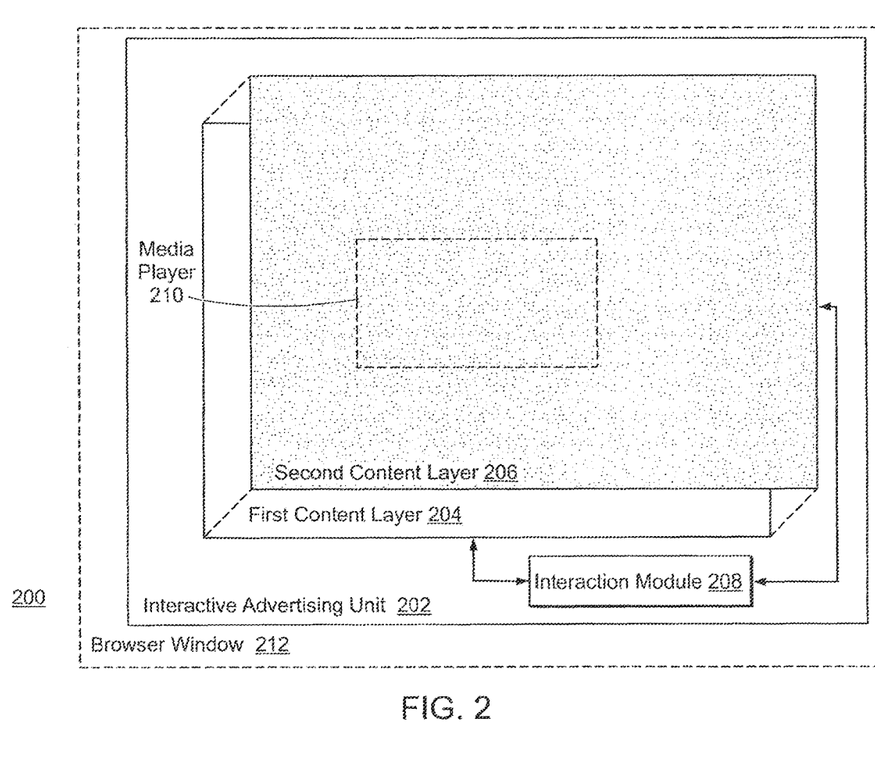
FIG. 2 is a diagram of an interactive advertising unit to display media content and advertising content.

FIG. 2 is a diagram 200 of an interactive advertising unit 202 to display media content and advertising content.

A user interacts with the system 100 by opening a web browser 212 on the client computing device 102 and entering the address of the web server 106. The client computing device 102 sends a content request associated with the address entered by the user to the server computing device 106. Once the server computing device 106 receives the request, the server computing device 106 retrieves the requested content and transmits the content for display in the web browser 212 on the computing device 102. For example, the user can enter a standard web address, such as http://www.mtv.com/videos/, into the browser window 212 at the client computing device 102. The web server 106 can then transmit the web page located at mtv.com/videos/to the computing device 102 for display in the browser 212.

In yet other examples, the owner of the server computing device 106 may wish to present an advertisement to the user when the user requests digital media content. As above, the user interacts with the system 100 by entering or navigating to the address of media content associated with the server computing device 106. Upon receiving the request, the server computing device 106 retrieves the requested media content (e.g., from media server 110). Before transmitting the requested media content to the computing device 102, the server computing device retrieves advertising content (e.g., from the ad server 108). In some embodiments, the advertising content is selected by the server computing device 106 based on predetermined criteria, such as a focused advertising campaign. Examples of an advertising campaign can include a predetermined number of displays of the advertising content, a predefined period of time in which the advertising content will be selected for display, a marketing, association between the owner of the advertising content, the producer of the requested video content, and the like. The server computing device 106 combines the advertising content and the requested digital media content to provide an interactive advertising unit 202. The server computing device 106 transmits the interactive advertising unit 202 to the client computing device 102 for presentation to a user. The interactive advertising unit 202 presents the advertising content (e.g., from ad server 108) along with the digital media content requested by the user (e.g., from media server 110) in a number of interesting, memorable, and dynamic ways, as shown below.

In some embodiments, the server computing device 106 combines the digital media content and the advertising content into an interactive advertising unit 202 using a multi-layered approach. The server computing device 106 places the digital media content and associated media player into a first content layer 204, and places the advertising content into a second content layer 206. In one embodiment, the second content layer 206 is positioned on top of the first content layer 204 of the interactive advertising unit 202. The interactive advertising unit 202 is transmitted to the client computing device 102 for display, such as in browser window 212 (e.g., embedded in a larger web page). In some embodiments, the interactive advertising unit 202 provides the second content layer 206 using the <div> tag provided by the HTML programming language, in association with Cascading Style Sheets (CSS) to coordinate presentation attributes of the <dive> tag.

The interactive advertising unit 202 includes an interaction module 208 which coordinates the interactions between the content layers (e.g., first content layer 204 and second content layer 206). The interaction module 208 manages the spatial presentation, synchronizes the temporal presentation, and controls the presentation priority of the advertising content and the digital media content in the respective content layers 204 and 206. The interaction module 208 coordinates the spatial, temporal, and control functionality to work in concert with each other, advantageously merging the features of each presentation type.

Management of the spatial relationship between the digital media content and the media player in the first content layer 204, and the advertising content in the second content layer 206, is important to providing an engaging and dynamic experience to the user. In one embodiment, the interaction module 208 of the interactive advertising unit 202 positions the second content layer 206 in certain areas above the first content layer 204, thereby enabling the strategic placement of the advertising content in an area that catches the user's attention while keeping the digital media content in the first content layer 204 unobstructed and available for viewing. In another embodiment, the interaction module 208 of the interactive advertising unit 202 positions the second content layer 206 in certain areas above the first content layer 204 in a way that masks or obscures the digital media content in the first content layer 204. In this embodiment, the interaction module 208 leverages the masking of the digital media content to emphasize the advertising content or to reveal the digital media content to the user in a dramatic and unexpected way. In any of these embodiments, the second content layer 206 can be partially or fully transparent until the interactive advertising unit 202 displays the advertising content.

Synchronization of the temporal relationship between the digital media content and the media player in the first content layer 204, and the advertising content in the second content layer 206, is also important to achieving a unique and unexpected user experience, in one embodiment, the interaction module 208 displays advertising content (e.g., a pre-roll video, a pop-up ad) before presentation of the digital media content to assist the user in making a "connection" between the advertised goods and the media content, and thereby increasing the user's anticipation of and engagement in the content.

In addition, control of the presentation priority between the digital media content in the first content layer 204, and the advertising content in the second content layer 206, is important for augmenting the interactive functionality of the interactive advertising unit 202 to increase user interest in and appeal of the presented content. In one embodiment, the interaction module 208 of the interactive advertising unit 202 displays the advertising content until the module 208 receives a user input request to skip the advertising content and begin displaying the requested digital media content in the media player 210, thereby inducing the user to interact with the advertising content and maximizing exposure for the advertised goods. In another embodiment, the interaction module 208 of the interactive advertising unit 202 displays the advertising content until the content has completed its playback then transitions to displaying the requested digital media content in an unexpected way. In this embodiment, the interaction module 208 integrates the display of the advertising content seamlessly into the overall presentation to enable advertising opportunities that are dynamic and interesting.

Although shown as covering almost the entire browser window 212, the content layers 204 and 206 of the interactive advertising unit 202 can vary in size and cover any portion of the browser window 212. In some embodiments, the interactive advertising unit 202 includes multiple content layers, in addition to the first and second content layers 204 and 206. In one embodiment, the interactive advertising unit 202 places one content layer (e.g., second content layer 206) above a media player 210 contained in another content layer (e.g., first content layer 204), while the interactive advertising unit 202 can place another separate content layer (not shown) above a different section of the browser window 212, such as above the top portion or in a side margin. The interaction module 208 of the interactive advertising unit 202 coordinates the spatial presentation management, temporal presentation synchronization, and the presentation priority control of the content residing in each of the provided content layers (e.g., layers 204 and 206). In one embodiment, the interaction module 208 uses a protocol such as LocalConnections provided in the Adobe Flash® development tool to communicate between the respective content layers (e.g., layers 204 and 206).

FIGS. 3A-3E are screenshots of an exemplary embodiment of video-advertising content of the invention, wherein a wall-to-wall advertising unit 302c is integrated with digital media content. Although the advertising video and wall-to-wall advertising unit embodied herein are related to advertisement of a motion picture, the invention is not limited in content or scope to this embodiment and can encompass any advertising subject, theme, or products.

Figure 3A:
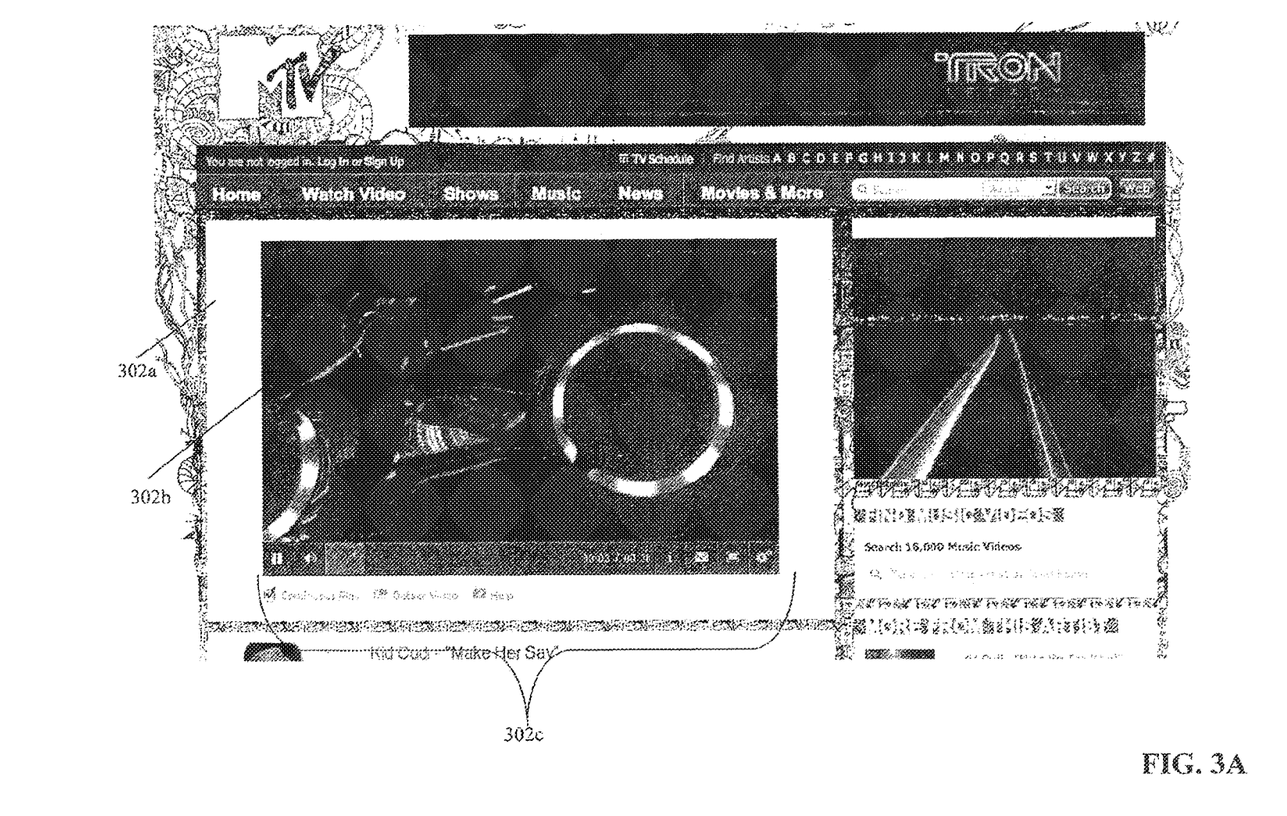
FIGS. 3A-3E are screenshots of an exemplary embodiment of video-advertising content of the invention, wherein a wall-to-wall advertising unit is integrated with digital media content.

In FIG. 3A, a media player 302b for displaying the digital video content is embedded in a browser window 302a. When the browser window 302a loads the web page, the interactive advertising unit 302c is layered on top of the playback area of the media player 302b, creating the appearance to a user that the interactive advertising unit 302c is contained within the boundaries of the playback area of the media player 302b. The media player 302b stops pie back of the requested digital media content located below the interactive advertising unit 302c, and transfers control to the interactive advertising unit 302c for display of the advertising content. Upon receiving control, the interactive advertising unit 302c begins displaying advertising content (e.g., a pre-roll advertising video) and the user believes the advertising video is a standard pre-roll advertisement which will play through in its entirety before the requested digital media content can be accessed. The interactive advertising unit 302c displays only the portion of the widescreen advertising video that falls within the simulated boundaries of the media player 302b.

Figure 3B:
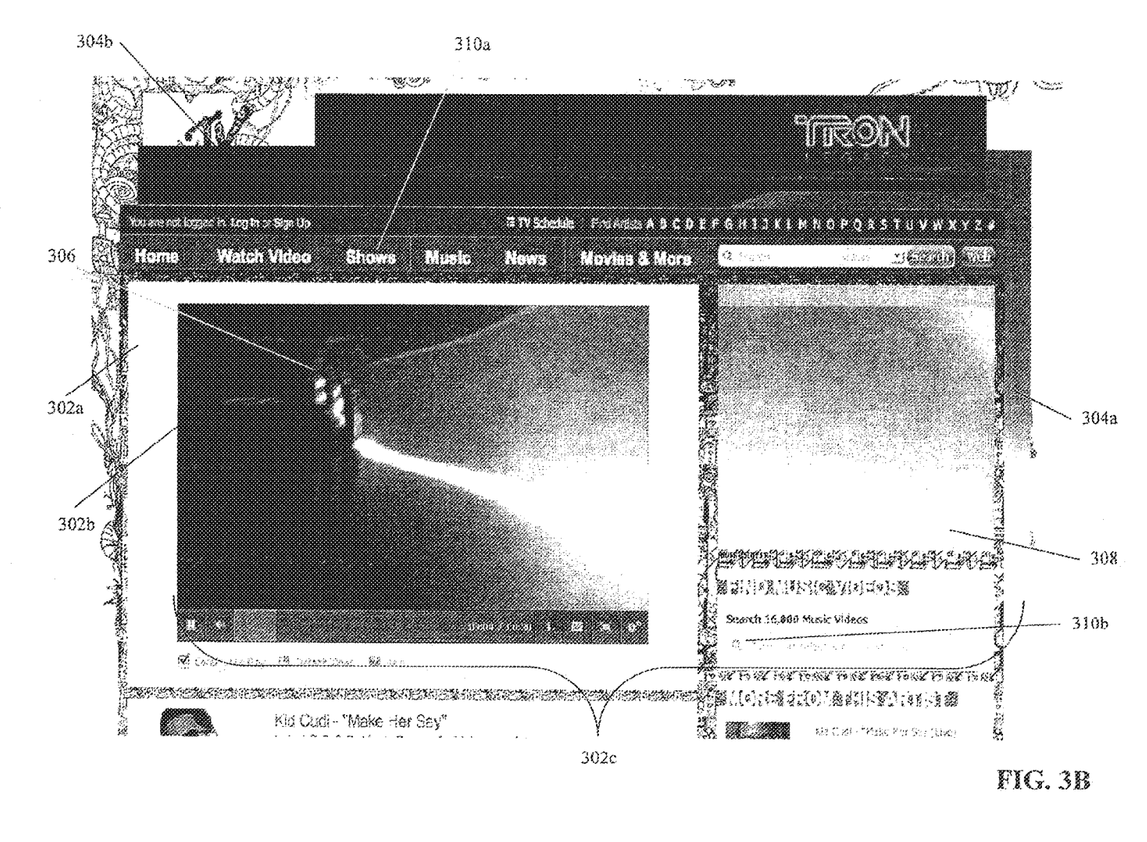

Shortly after the interactive advertising unit 302c begins playback of the pre-roll advertising video (e.g., ten seconds), the interactive advertising unit 302c breaks the simulated boundaries of the media player 302b in a visually stimulating and unexpected manner. The interactive advertising unit 302c reveals previously-hidden portions of the widescreen advertising video that fall outside the simulated boundaries of the media player 302b. Referring to FIG. 3B, the interactive advertising unit 302c displays the previously-hidden portions (e.g., portions 304a and 304b) of the widescreen advertising video based on the content of the advertising video. In this example, the motorcycle 306 depicted in the advertising video appears to enter the video from the right-hand side and move toward the center of the video within the boundaries of the media player 302b, At the same time that the motorcycle 306 appears in the video, the interactive advertising unit 302c reveals the right-hand portion 304a. of the video that was previously hidden to the user. As the right-hand portion 304a is revealed to the user, the interactive advertising unit 302c claims an area of the web page occupied by static content (e.g., banner advertisement 308). Thereafter, the widescreen video is displayed in that area of the web page and replaces the static content. Similar effects and synchronization with the content of the advertising video can be used to reveal the other hidden portions of the video (e.g., portion 304b).

Figure 3C:
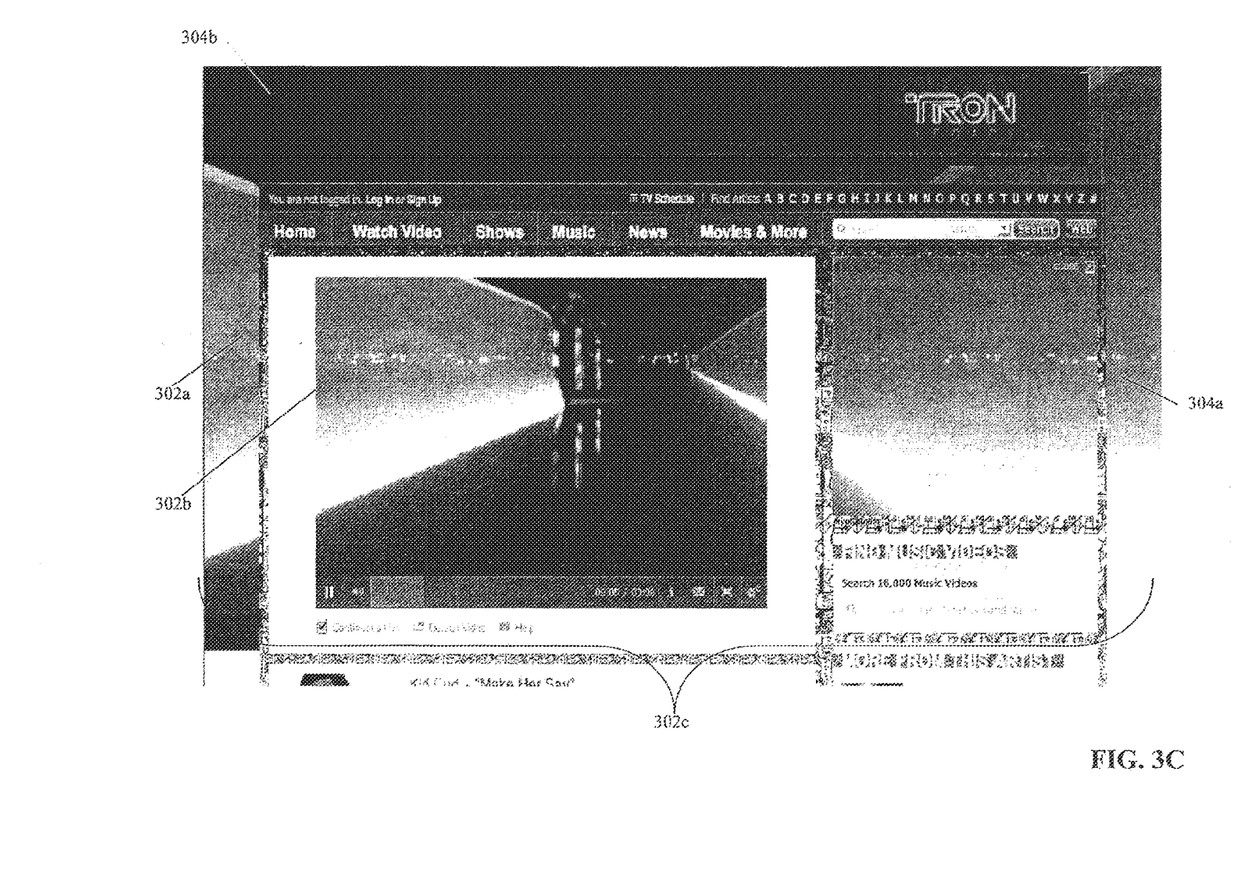

However, the interactive advertising unit 302c does not claim the area occupied by interactive content (e.g., links 310a, search fields 310b) for displaying the widescreen video. This interactive content remains visible and available for interaction with the user. For example, during playback of the widescreen video, the user can click one of the displayed links 310a to be directed to another web page. Referring to FIG. 3C, the interactive advertising unit 302c has completed revealing the previously-hidden portions (e.g., portions 304a and 304b) of the widescreen advertising video. The widescreen advertising video covers the width of the browser window 302a. The retention of the interactive content (e.g., links 310a, search fields 310b) gives the appearance that the widescreen advertising video is displayed on a different layer from (e.g., underneath) the interactive content.

Figure 3D:
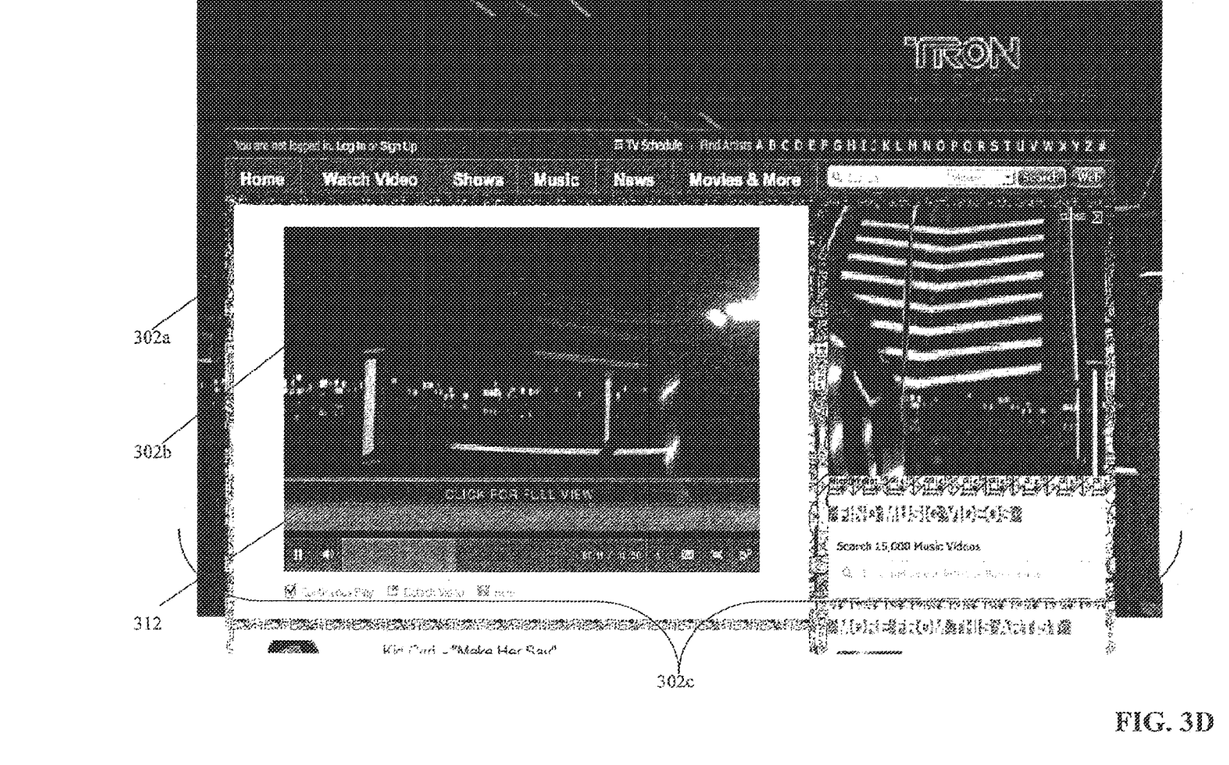

Referring to FIG. 3D, another feature of the interactive advertising unit 302c is the display of a user interface feature 312 during playback of the widescreen advertising video. The user interface feature 312 displays a message to the user (e.g., "Click for Full View"). Upon receiving input (e.g., a mouse click) from the use via the user interface feature 312, the interactive advertising unit 302c can display a fullscreen view of the advertising video. The fullscreen view can cover or obscure the entire display area of the user, including the browser window 302a, the media player 302b, and the requested media content. While in fullscreen view, the user can perform an action (e.g., press a key) to return to the previous display of the widescreen advertising video in conjunction with the interactive content of the web page.

When the advertising video ends, the interactive advertising unit 302c hides the portions of the advertising video that fall outside the simulated boundaries of the media player 302b and the portion of the advertising video that falls within the simulated boundaries of the media player 302b disappears. The media player 302b and requested media content are subsequently revealed to the user. Before the interactive advertising unit 302c returns control to the media player 302b, the interactive advertising unit 302c transmits instructions to the banner advertisements 314a and 314b to advance to the next frame of the displayed advertisement. For example, the banner advertisements 314a and 314b display different content than previously (i.e., the "Click to View Full Trailer" message of FIG. 3E which does not appear in the banner advertisements of FIG. 3A).

Figure 3E:
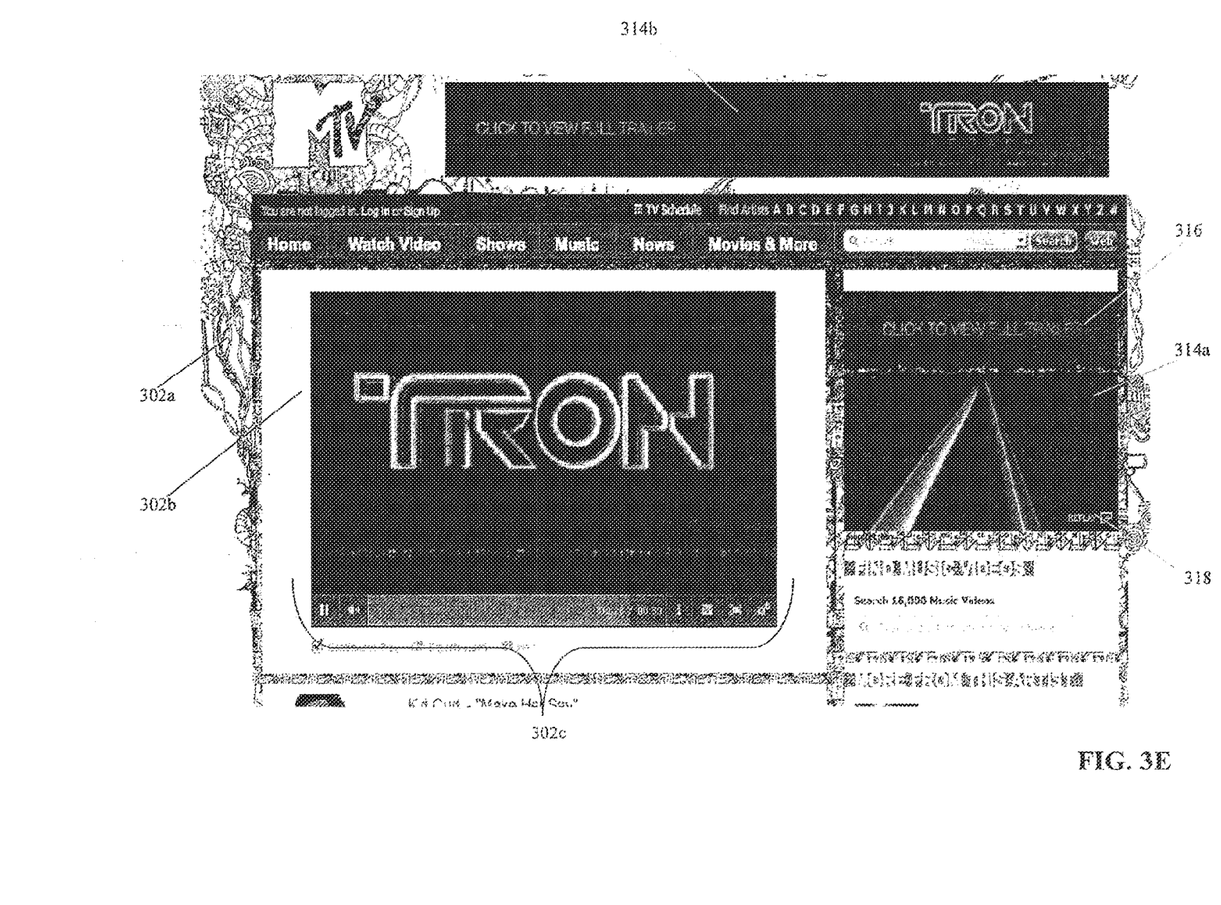

As the interactive advertising unit 302c returns control to the media player 302b, the media player 302b resumes playback of the digital media content. However, the interactive advertising unit 302c does not completely disappear from the web page. Referring to FIG. 3E, the interactive advertising unit 302c remains present and active through displaying interactive residual content (e.g., harmer advertisements 314a and 314b) in the browser window 302a.

At any time during playback of the requested media content, the user can interact with the advertisements 314a and 314b to re-engage the interactive advertising unit 302c. For example, the user can click the advertisements 314a and 314b, thereby communicating a desire to view content associated with the interactive advertising unit 302c. For example, the user can click the "Click to View Full Trailer" message 316 within the advertisement 314a. As another example, the user can click the "Replay" message 318 within the advertisement 314a. Upon receiving such input, the rich-media player displaying the interactive advertising unit 302c regains control from, the media player 302b, and recaptures the area above the media player 302b to display advertising content. The media player 302b stops playback of the requested media content as it passes control back to the rich-media player. The interactive advertising unit 302c again displays the widescreen advertising video.

In some embodiments, the advertisements 314a and 314b are replaced with one or more fully functional microsites. The microsites contain the full capability found in typical web sites. The microsites can be related in content to the interactive advertising unit 302c, and can include input tools such as buttons, links, and search fields to enhance the user experience by providing additional interactivity and prominence of the advertising content. For example, the microsite can contain links to the corporate web page of the company advertising its products, interactive applications designed to enhance the exposure of the advertised product, and additional information such as where to purchase the product.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in arty form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network, Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a Wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for dynamic integration and presentation of advertising content and media content, the method comprising:
   receiving, by a server computing device, a request for media content from a remote computing device; and
   providing to the remote computing device, by the server computing device in response to the request, an interactive advertising unit comprising:
      a first content layer including the requested media content, a media player, and website content;
      a second content layer including the advertising content, wherein the advertising content comprises video content; and
      an integration module configured to:
         display the video content to match the boundaries of the media player;
         extend the display area of the video content beyond the boundaries of the media player and underneath the website content of the first content layer;
         reduce the display area of the video content after a period of time to match the boundaries of the media player; and
         display the requested media content in the media player.

2. The method of claim 1, the integration module being configured for execution on the remote computing device and being further configured to: manage the spatial presentation of the requested media content and the advertising content; synchronize the temporal presentation of the requested media content and the advertising content; and control the presentation priority of the requested media content and the advertising content.

3. The method of claim 2, wherein managing the spatial presentation includes positioning the advertising content over the media player so as to obscure the requested media content.

4. The method of claim 1, wherein the integration module is executed on the remote computing device to display an animation by extending the display area of the video content beyond the boundaries of the media player.

5. The method of claim 4, Therein the animation is synchronized with playback of the video content.

6. The method of claim 1, wherein the integration module is configured to be executed on the remote computing device to extend the display area of the video content to a widescreen format.

7. The method of claim 1, wherein the video content is displayed in a high definition resolution.

8. The method of claim 1, the integration module is configured to be executed on the remote computing device and is further configured to:
   display a user interface feature within the boundaries of the media player after extending the display area of the video content beyond the boundaries of the media player and underneath the website content of the first content layer; and
   display, in response to receiving input associated with the user interface feature, the video content in a fullscreen format, wherein display of the fullscreen format obscures the requested media content, media player, and website content of the first content layer.

9. The method of claim 1, wherein the integration module is configured to be executed on the remote computing device to display an animation by reducing the display area of the video content to match the boundaries of the media player.

10. The method of claim 1, the integration module is configured to be executed on the remote computing device and is further configured to receive input based on a user action.

11. The method of claim 1, wherein the video content includes a graphical representation of an advertised product, an advertised service, or both.

12. The method of claim 1, wherein the integration module is configured to be executed on the remote computing device and to transmit one or more commands from the second content layer to the first content layer, the one or more commands operable to control playback of the requested media content in the media player.

13. A system for dynamic integration and presentation of advertising content and media content, the system comprising:
    a server computing device configured to:
        receive a request for media content from a remote computing device; and
        provide to the remote computing device for execution on the remote computing device, in response to the request, an interactive advertising unit comprising:
            a first content layer including the requested media content, a media player, and website content;
            a second content layer including the advertising content, wherein the advertising content comprises video content; and
            an integration module configured to:
                display the video content to match the boundaries of the media player;
                extend the display area of the video content beyond the boundaries of the media player and underneath the website content of the first content layer;
                reduce the display area of the video content after a period of time to match the boundaries of the media player; and
                display the requested media content in the media player.

14. A computer program product, tangibly embodied in a non-transitory computer readable storage medium, for dynamic integration and presentation of advertising content and media content, the computer program product including instructions operable to configure a data processing apparatus to:
    receive a request for media content from a remote computing device; and
    provide to the remote computing device for execution on the remote computing device, in response to the request, an interactive advertising unit comprising:
        a first content layer including the requested media content, a media player, and website content;
        a second content layer including the advertising content, wherein the advertising content comprises video content; and
        an integration module configured to:
            display the video content to match the boundaries of the media player;
            extend the display area of the video content beyond the boundaries of the media player and underneath the website content of the first content layer;
            reduce the display area of the video content after a period of time to match the boundaries of the media player; and
            display the requested media content in the media player.

\* \* \* \* \*